United States Patent
Liu et al.

(10) Patent No.: US 11,247,174 B2
(45) Date of Patent: Feb. 15, 2022

(54) DRAINAGE DEVICE AND SYSTEM FOR CONTROLLING DISCHARGING OF CONCENTRATED WATER IN WATER PURIFICATION PROCESS

(71) Applicant: SUQIAN HANSHU ENVIRONMENTAL PROTECTION EQUIPMENT CO., LTD, Nanjing (CN)

(72) Inventors: Guo Liu, Nanjing (CN); Xiaohan Liu, Nanjing (CN)

( * ) Notice: Subject to any disclaimer, the term of this patent is extended or adjusted under 35 U.S.C. 154(b) by 0 days.

(21) Appl. No.: 17/317,169

(22) Filed: May 11, 2021

(65) Prior Publication Data

US 2021/0260529 A1  Aug. 26, 2021

Related U.S. Application Data

(63) Continuation of application No. PCT/CN2019/126092, filed on Dec. 17, 2019.

(30) Foreign Application Priority Data

Dec. 24, 2018 (CN) .......................... 201811582986.2

(51) Int. Cl.
*B01D 61/10* (2006.01)
*B01D 61/02* (2006.01)
(Continued)

(52) U.S. Cl.
CPC ........... *B01D 61/10* (2013.01); *B01D 61/025* (2013.01); *B01D 61/12* (2013.01); *C02F 1/008* (2013.01);
(Continued)

(58) Field of Classification Search
None
See application file for complete search history.

(56) References Cited

U.S. PATENT DOCUMENTS

| 4,923,167 A | 1/1990 | Schmidt |
| 2014/0239211 A1 | 8/2014 | Morgan et al. |
| 2019/0331572 A1* | 10/2019 | Wang ........................ G01N 3/02 |

FOREIGN PATENT DOCUMENTS

| CN | 205090011 U | 3/2016 |
| CN | 106598089 A | 4/2017 |

(Continued)

OTHER PUBLICATIONS

Internation Search Report of PCT/CN2019/126092, dated Mar. 16, 2020.

*Primary Examiner* — Richard C Gurtowski (57) ABSTRACT

Provided is a drainage device and a system for controlling discharging of concentrated water in a water purification process. The device includes a valve cavity, a flowmeter, a transmission shaft and a control unit. The control unit is used for controlling a motion of the transmission shaft to adjust a liquid flow of the flowmeter in the valve cavity. The device inhibits an instantaneous impact of a liquid on the valve cavity to relieve vibration generated by the instantaneous impact; a special structural design is employed, which is favorable for controlling a flow of the concentrated water; moreover, the device is suitable for different pressure environments, achieves the objectives of small volume, controllable fitting area and small friction force; prevents leakage, and is easy to maintain and clean; and abnormal discharging of the concentrated water caused by water hammer and liquid impact in a water purification system is solved.

20 Claims, 8 Drawing Sheets

(51) Int. Cl.
*B01D 61/12* (2006.01)
*C02F 1/00* (2006.01)
*C02F 1/44* (2006.01)
*F16K 47/02* (2006.01)

(52) U.S. Cl.
CPC .............. *C02F 1/441* (2013.01); *F16K 47/02* (2013.01); *C02F 2201/005* (2013.01); *C02F 2209/03* (2013.01); *C02F 2209/10* (2013.01); *C02F 2209/40* (2013.01)

(56) References Cited

FOREIGN PATENT DOCUMENTS

| | | |
|---|---|---|
| CN | 109458490 A | 3/2019 |
| CN | 209340637 U | 9/2019 |
| JP | 2002122250 A | 4/2002 |
| JP | 2007100841 A | 4/2007 |

\* cited by examiner

DRAINAGE DEVICE AND SYSTEM FOR CONTROLLING DISCHARGING OF CONCENTRATED WATER IN WATER PURIFICATION PROCESS

CROSS-REFERENCE TO RELATED APPLICATIONS

This application is a continuation of International Patent Application No. PCT/CN2019/126092 with a filing date of Dec. 17, 2019, designating the United States, now pending, and further claims priority to Chinese Patent Application No. 201811582986.2 with a filing date of Dec. 24, 2018. The content of the aforementioned applications, including any intervening amendments thereto, are incorporated herein by reference.

TECHNICAL FIELD

The present application relates to the field of water purification, and more particularly, to a drainage device and a system for controlling discharging of concentrated water in a water purification process.

BACKGROUND

According to a traditional water purification system adopting a reverse osmosis membrane, a booster pump is used as power of the water purification system. When a fixed discharge ratio of concentrated water is used, due to a physical characteristic of the membrane, a recovery rate of purified water is decreased with the decrease of a water temperature, and the discharge ratio of the concentrated water is gradually increased, resulting in a large amount of waste of water resources. When an adjustable flow of the concentrated water is used, a discharge of the concentrated water is mainly adjusted by a valve. This method belongs to human intervention, and can only achieve simple fuzzy adjustment, but can not achieve precise control, which will either cause waste of purified water or unqualified purified water. At present, the water purification system, which adjusts the discharging of the concentrated water by automatic control, has a single control mode and great limitations, and belongs to a primary stage of controllable discharging.

For the water purification system adopting an ultra-low pressure membrane, the water purification system is driven by a tap water pressure. Since a tap water pressure of each household is quite different, different or unstable water pressure environments of a water purifier easily lead to an unstable water production rate of the membrane and an unstable water quality after recovery.

Meanwhile, in actual application, due to a design of the water purification system or an inlet water source, water in the water purification system contains gas or bubbles, and the persistent gas or bubbles are discharged from a concentrated water valve, generating water hammer and liquid hammer, so that a valve core of a concentrated water valve is worn and a jitter noise is generated, resulting in an abnormal discharge of the concentrated water over time.

SUMMARY

The present application provides a drainage device and a system for controlling discharging of concentrated water in a water purification process to solve a problem of abnormal discharging of the concentrated water caused by water hammer and liquid impact in a water purification system.

In order to solve the above technical problem, the present application provides the following technical solutions.

The present application provides the drainage device, which includes a valve cavity, a flowmeter, a transmission shaft, and a control unit, wherein:

an inner cavity wall of the valve cavity is provided with an inner shoulder, and the inner shoulder divides the inner cavity of the valve cavity into a first cavity and a second cavity which are communicated;

the first cavity is provided with a first water inlet hole penetrating through the cavity wall;

the second cavity is provided with a first water outlet hole penetrating through the cavity wall and a first shaft hole, and the first shaft hole is a cylindrical hole, and arranged on an opposite face of a communication port between the first cavity and the second cavity;

the flowmeter is arranged in a space formed by the first cavity and the second cavity, and includes a first cylinder, a first baffle, a first flow hole, and a second flow hole;

the first baffle forms an outer shoulder of the flowmeter; and the outer shoulder is matched, and hermetically, movably and fixedly connected with the inner shoulder of the first cavity;

the first cylinder penetrates through the first baffle, an inner cavity of the first cylinder is in a cylindrical shape, and the cylindrical shape is coaxial with the first shaft hole; the first cylinder includes a first portion and a second portion; the first portion extends into the first cavity, and a side wall of the first portion is provided with a through first flow hole; and the second portion extends into the second cavity, an opening of the second portion faces the first shaft hole, and a side wall of the second portion is provided with a through second flow hole; and the transmission shaft is a cylinder, which passes through the first shaft hole and the first cylinder, and is hermetically and movably connected with the first shaft hole and the first cylinder, one end of the transmission shaft entering the first cylinder is provided with a diversion portion, and the other end of the transmission shaft extending from the first shaft hole outside the valve cavity is matched with the control unit to control a motion of the transmission shaft, so that the diversion portion is matched with the first flow hole and the second flow hole to control a liquid flow, so as to divert the liquid from the first cavity to the second cavity.

Preferably, the diversion portion is a flow through hole passing through the transmission shaft; the flow through hole includes a first diversion port and a second diversion port which are arranged in an outer wall of the transmission shaft; the first diversion port is matched with the first flow hole, and a liquid flow flowing from the flowmeter into the flow through hole is controlled by the motion of the transmission shaft; and the second diversion port is matched with the second flow hole to divert the liquid from the flow through hole to the second cavity.

Preferably, the flow through hole is a straight hole.

Preferably, the diversion portion is a flow channel; and the flow channel is matched with the first flow hole and the second flow hole through the motion of the transmission shaft to control a liquid flow entering the flow channel from the first flow hole, and divert the liquid from the flow channel to the second cavity through the second flow hole.

Preferably, a notch of the flow channel is gradually widened from the first flow hole to the second flow hole.

Preferably, the first flow hole is an isosceles triangular hole.

Preferably, the control unit controls an axial motion of the transmission shaft, and a bottom face of the isosceles triangular hole is perpendicular to an axis of the inner cavity of the first cylinder.

Preferably, the control unit controls a circumferential motion of the transmission shaft, and a bottom face of the isosceles triangular hole is parallel to an axis of the inner cavity of the first cylinder.

Preferably, a vertex angle of the isosceles triangle is an acute angle.

Preferably, the flowmeter further includes a second cylinder which is sleeved outside the first cylinder, one end of the second cylinder is hermetically and fixedly connected with the first baffle, and the other end of the second cylinder is opened and faces the inner wall of the first cavity, and is provided with a first water inlet hole penetrating through a side wall of the second cylinder.

Preferably, the first water inlet hole is arranged in a cylinder wall of the second cylinder far away from the first flow hole.

Preferably, an outer side wall of the second cylinder is movably connected with the inner wall of the first cavity.

Preferably, the opening of the second cylinder extends to a vicinity of the inner wall of the first cavity.

Preferably, the second cylinder further includes a plurality of splitter plates; and the splitter plates are fixedly connected with the inner wall of the second cylinder and used for slowing down a flow rate of the liquid flowing into the flowmeter.

Preferably, an inner cavity of the second cylinder is in a cylindrical shape, and the splitter plates are evenly distributed along an axis of the cylindrical shape and are perpendicular to the inner wall of the second cylinder.

Preferably, the first flow hole is arranged between extended planes formed by two splitter plates; and the first water inlet hole is arranged between two splitter plates.

Preferably, a cavity wall of the first cavity opposite to an opening end of the second cylinder is a second baffle; and the second baffle plate is hermetically, movably and fixedly connected with the first cavity.

Preferably, the second cavity further includes a gas accommodation portion for collecting gas in the second cavity and discharging the gas from the first water outlet hole.

The present application provides the system for controlling discharging of concentrated water in the water purification process, wherein the system at least includes the drainage device according to any one of claims 1 to 18, and a processor, a pressure gauge, a water purifier, a first switch, and a water delivery pipeline;

the control unit at least includes a transmission gear and a first motor;

the transmission gear is provided with a coaxial transmission through hole, the transmission through hole is movably connected with the transmission shaft, and an outer edge of the transmission gear is provided with first gear teeth;

the first motor is in signal connection with the processor, a driving rod of the first motor is provided with a driving gear, gear teeth of the driving gear are connected with the first gear teeth, and the first motor drives the driving gear to drive the transmission gear to rotate, so that the transmission shaft moves;

the water purifier at least includes a reverse osmosis membrane or an ultra-low pressure reverse osmosis membrane, a water inlet of the water purifier is used for inputting raw water, a first water outlet of the water purifier is used for outputting purified water, and a second water outlet of the water purifier is connected with the first water inlet hole of the drainage device for outputting concentrated water;

the pressure gauge is in signal connection with the processor, arranged in the first cavity, and used for collecting pressure information in the first cavity and transmitting the pressure information to the processor;

the first switch is in signal connection with the processor, arranged in the water delivery pipeline, and used for controlling the water purifier to produce water; and the processor is used for acquiring a water production signal; acquiring first information according to the water production signal and transmitting opening information to the first switch, wherein the first information includes pressure information; and according to the first information and a preset control rule, driving the first motor to control the transmission shaft to move, so as to achieve a preset purified water discharge ratio of the concentrated water.

Preferably, the system further includes a first TDS measuring device, wherein the first TDS measuring device is in signal connection with the processor, arranged in the water delivery pipeline in front of the water purifier, and used for collecting first TDS information and transmitting the first TDS information to the processor; and the first information further comprises the first TDS information.

Preferably, the system further includes a second TDS measuring device, wherein the first information further includes second TDS information; and the second TDS measuring device is in signal connection with the processor, arranged in the water delivery pipeline behind the water purifier, and used for collecting the second TDS information and transmitting the second TDS information to the processor.

Preferably, one end of the transmission shaft extending out of the valve cavity from the first shaft hole is provided with an external thread; the transmission through hole is provided with an internal thread in threaded connection with the external thread of the transmission shaft; and the first motor drives the driving gear to drive the transmission gear to rotate, so that the transmission shaft moves axially.

Preferably, one end of the transmission shaft extending out of the valve cavity from the first shaft hole is provided with an external gear; the transmission through hole is provided with an internal gear in threaded connection with the external gear of the transmission shaft; and the first motor drives the driving gear to drive the transmission gear to rotate, so that the transmission shaft moves circumferentially.

Preferably, two sides of the transmission gear are provided with bearings.

Preferably, the pressure gauge includes a pressure switch device.

It can be known from the disclosures of the above embodiments that the embodiments of the present application have the following beneficial effects.

The present application provides the drainage device and the system for controlling discharging of concentrated water in the water purification process, the drainage device includes the valve cavity, the flowmeter, the transmission shaft, and the control unit; the inner cavity wall of the valve cavity is provided with the inner shoulder, and the inner shoulder divides the inner cavity of the valve cavity into the first cavity and the second cavity which are communicated; the first cavity is provided with the first water inlet hole penetrating through the cavity wall; the second cavity is provided with the first water outlet hole penetrating through the cavity wall and the first shaft hole, and the first shaft hole is the cylindrical hole, and arranged on the opposite face of the communication port between the first cavity and the second cavity; the flowmeter is arranged in the space formed by the first cavity and the second cavity, and includes the first cylinder, the first baffle, the first flow hole, and the second flow hole; the first baffle forms the outer shoulder of the flowmeter; the outer shoulder is matched, and hermetically, movably and fixedly connected with the inner shoulder of the first cavity; the first cylinder penetrates through the first baffle, the inner cavity of the first cylinder is in the cylindrical shape, and the cylindrical shape is coaxial with the first shaft hole; the first cylinder includes the first portion and the second portion; the first portion extends into the first cavity, and the side wall of the first portion is provided with the through first flow hole; the second portion extends into the second cavity, the opening of the second portion faces the first shaft hole, and the side wall of the second portion is provided with the through second flow hole; the transmission shaft is the cylinder, which passes through the first shaft hole and the first cylinder, and is hermetically and movably connected with the first shaft hole and the first cylinder, one end of the transmission shaft entering the first cylinder is provided with the diversion portion, and the other end of the transmission shaft extending from the first shaft hole outside the valve cavity is matched with the control unit to control the motion of the transmission shaft, so that the diversion portion is matched with the first flow hole and the second flow hole to control the liquid flow, so as to divert the liquid from the first cavity to the second cavity.

According to the device of the present application, an instantaneous impact of the liquid on the valve cavity is inhibited to relieve vibration generated by the instantaneous impact; a special structural design is employed, which is favorable for controlling a flow of the concentrated water; moreover, the device is suitable for different pressure environments, achieves the objectives of small volume, controllable fitting area and small friction force; prevents leakage, and is easy to maintain and clean; and a problem of abnormal discharging of the concentrated water caused by water hammer and liquid impact in the water purification system is solved.

REFERENCE NUMERALS 1 refers to first cavity, 2 refers to second cavity, 3 refers to flowmeter, 4 refers to transmission shaft, 5 refers to transmission gear, 6 refers to first motor, 7 refers to drainage device, 8 refers to pressure gauge, 9 refers to water purifier, 10 refers to first TDS measuring device, 11 refers to second TDS measuring device, 12 refers to water delivery pipeline, 13 refers to first switch, 14 refers to valve cavity, 15 refers to bearing, and 16 refers to control unit;

101 refers to first water inlet hole, 102 refers to inner shoulder, and 103 refers to second baffle;

201 refers to first water outlet hole, 202 refers to first shaft hole, and 203 refers to gas accommodation portion;

301 refers to first cylinder, 302 refers to first baffle, 303 refers to second cylinder, 304 refers to first water inlet hole, 305 refers to first flow hole, 306 refers to second flow hole, and 307 refers to splitter plate;

3021 refers to outer shoulder;

3011 refers to first portion, and 3012 refers to second portion;

401 refers to diversion portion;

4011 refers to flow through hole, 4012 refers to first diversion port, 4013 refers to second diversion port, and 4014 refers to flow channel;

501 refers to transmission through hole, and 502 refers to first gear teeth; and 601 refers to drive gear.

DETAILED DESCRIPTION

The specific embodiments of the present application are described in detail hereinafter with reference to the accompanying drawings, which are not used for limiting the present application.

It is to be understood that various modifications can be made to the embodiments disclosed herein. Therefore, the above specification should not be regarded as a limitation, but only as the examples of the embodiments. Those skilled in the art will think of other modifications within the scope and spirit of the present application.

The accompanying drawings included in and constitute a part of the specification illustrate the embodiments of the present application and, are used for explaining the principles of the present application with the general description of the present application given above and the detailed description of the embodiments given below.

These and other characteristics of the present application will become apparent from the following description of preferred forms of embodiments given as non-limiting examples with reference to the accompanying drawings.

It should also be understood that although the present application has been described with reference to some specific examples, those skilled in the art can certainly realize many other equivalent forms of the present application, which have the features in the claims and are therefore all within the scope of protection defined herein.

The above and other aspects, features and advantages of the present application will become more apparent in view of the following detailed description with reference to the accompanying drawings.

The specific embodiments of the present application are described hereinafter with reference to the accompanying drawings. However, it is to be understood that the disclosed embodiments are only examples of the present application, which can be implemented in various ways. Well-known and/or repetitive functions and structures are described in detail to avoid obscuring the present application by unnecessary or redundant details. Therefore, the specific structural and functional details disclosed herein are not intended to limit, but only used as the basis and representative basis of the claims for teaching those skilled in the art to variously use the present application in any suitable detailed structure virtually.

The specification may use the phrases "in an embodiment", "in another embodiment", "in yet another embodiment" or "in other embodiments", which may all refer to one or more of the same or different embodiments according to the present application.

The present application provides a drainage device and a system for controlling discharging of concentrated water in a water purification process. The drainage device and the system are described in detail in the following embodiments one by one.

The first embodiment is provided for the present application, which is namely the embodiment of the drainage device.

The embodiment is described in detail hereinafter with reference to FIG. 1 to FIG. 7.

Figure 1:
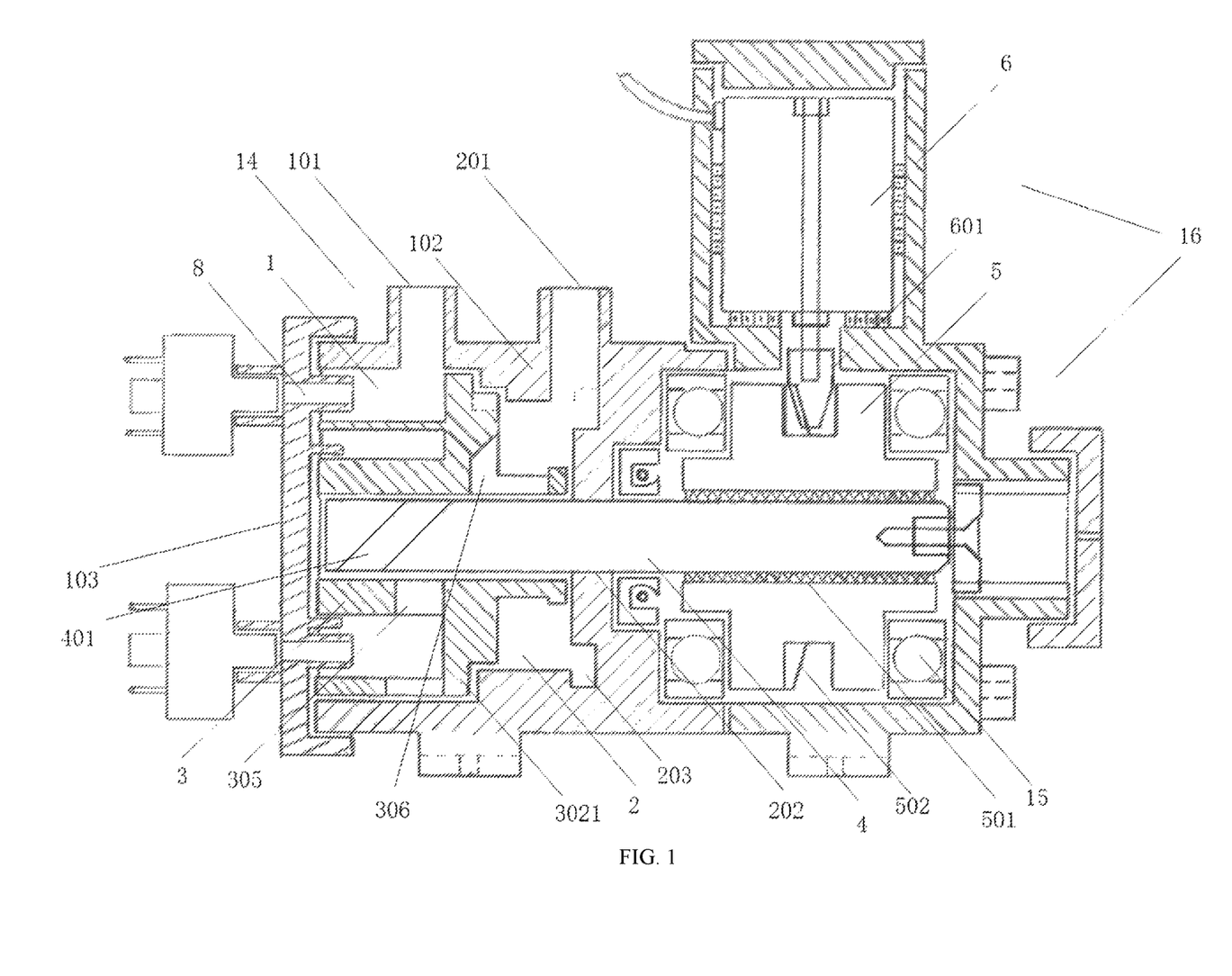
FIG. 1 is a structural diagram of a drainage device according to an embodiment of the present application.
Figure 2:
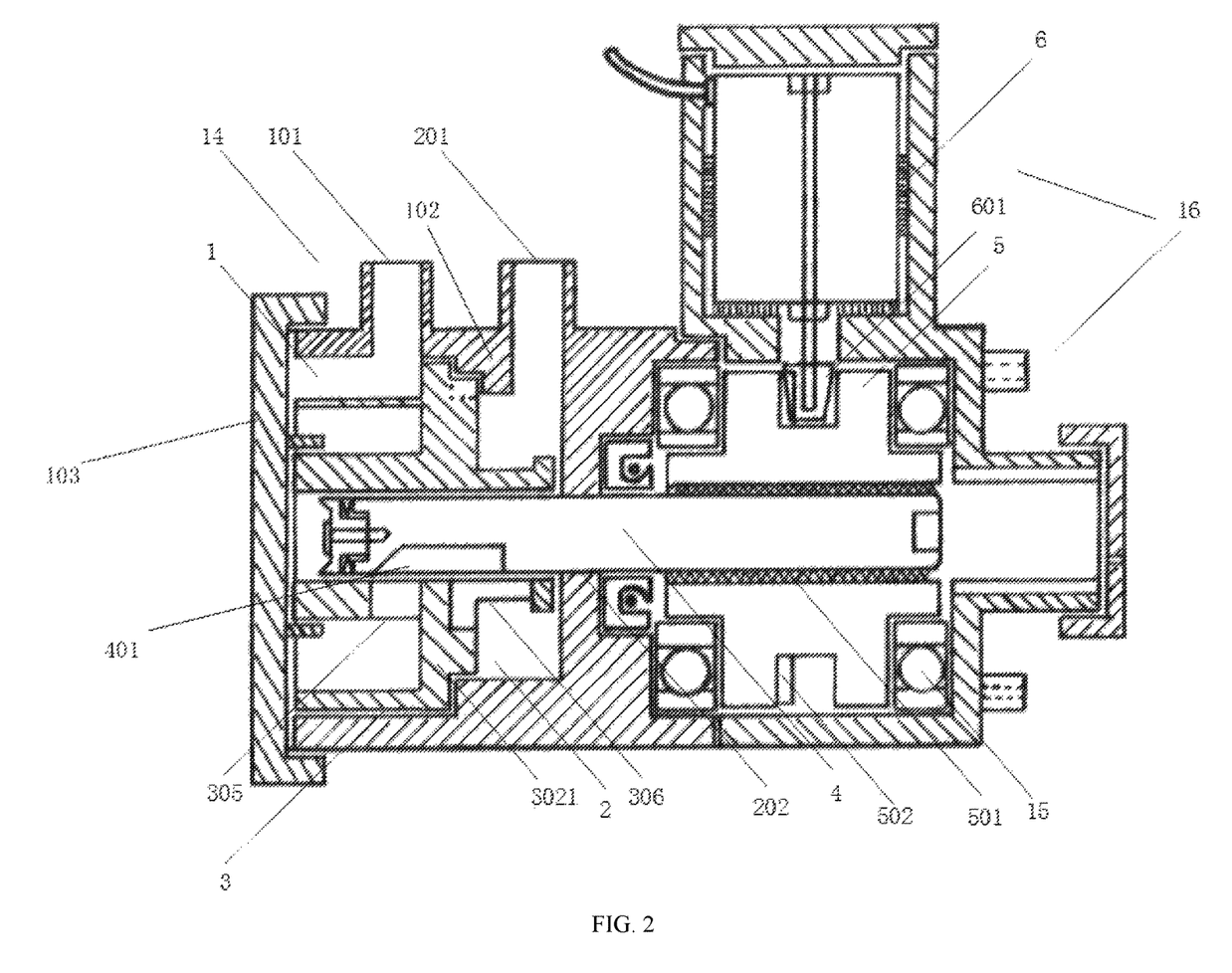
FIG. 2 is another structural diagram of the drainage device according to the embodiment of the present application.

With reference to FIG. 1 to FIG. 2, the embodiment provides a drainage device, which includes a valve cavity 14, a flowmeter 3, a transmission shaft 4, and a control unit 16.

An inner cavity wall of the valve cavity 14 is provided with an inner shoulder 102, and the inner shoulder 102 divides the inner cavity of the valve cavity 14 into a first cavity 1 and a second cavity 2 which are communicated.

The first cavity 1 is provided with a first water inlet hole 101 penetrating through the cavity wall.

The first water inlet hole 101 is used for being connected with a water purifier 9 and introducing concentrated water discharged from the water purifier 9 into the first cavity 1.

The second cavity 2 is provided with a first water outlet hole 201 penetrating through the cavity wall and a first shaft hole 202, and the first shaft hole 202 is a cylindrical hole, and arranged on an opposite face of a communication port between the first cavity 1 and the second cavity 2.

The first water outlet hole 201 is used for discharging concentrated water entering the second cavity 2 out of the second cavity 2.

Preferably, the second cavity 2 further includes a gas accommodation portion 203 for collecting gas in the second cavity 2 and discharging the gas from the first water outlet hole 201.

The water purification system cannot avoid intrusion of flowing gas or bubbles in water sources and the water purification system on the system in actual work. Since most of the persistent gas or bubbles in the water purification system may generally enter the first cavity 1 and then enter the second cavity 2, design of the gas accommodation portion 203 aims to smoothly discharge the gas from the second cavity 2, thus avoiding an influence of the gas on the discharging of the concentrated water.

Preferably, the gas accommodation portion 203 is a gas accommodation ring, which is a groove arranged on an inner wall of the second cavity 2, and the first water outlet hole 201 is located in the groove.

Figure 3:
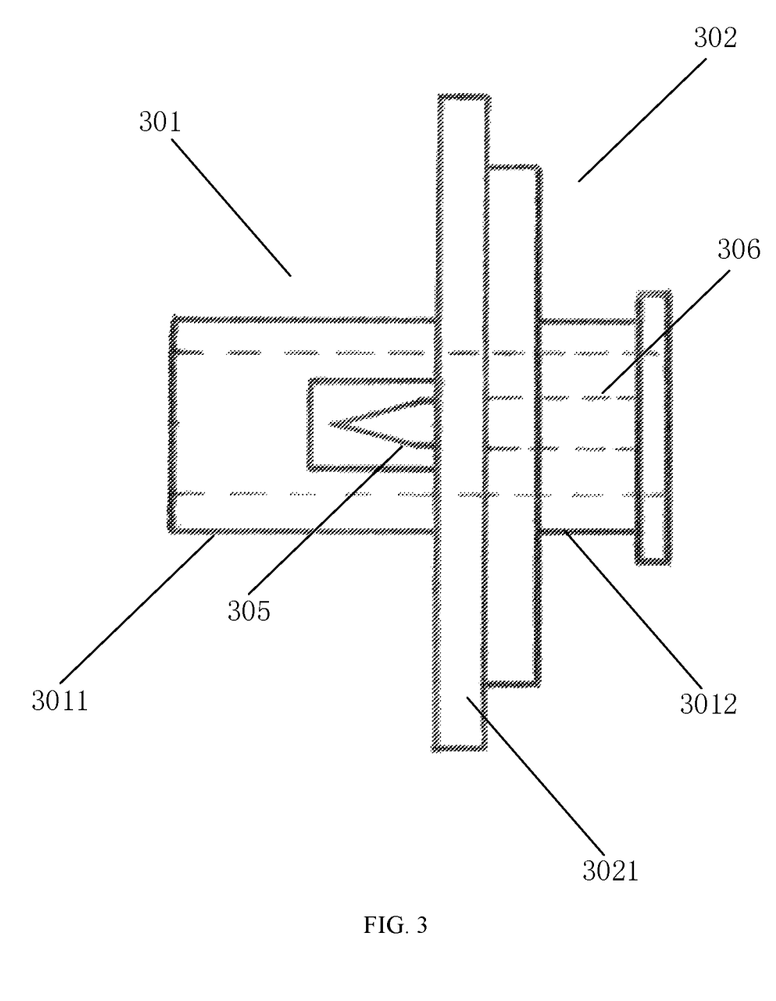
FIG. 3 is a side view of a flowmeter of the drainage device according to the embodiment of the present application.

With reference to FIG. 3, the flowmeter 3 is arranged in a space formed by the first cavity 1 and the second cavity 2, and includes a first cylinder 301, a first baffle 302, a first flow hole 305, and a second flow hole 306.

The first baffle 302 forms an outer shoulder 3021 of the flowmeter 3; and the outer shoulder 3021 is matched, and hermetically, movably and fixedly connected with the inner shoulder 102 of the first cavity 1, so that the flowmeter 3 may be taken out of the valve cavity 14 when cleaning. Meanwhile, in order to prevent the concentrated water from flowing from the first cavity 1 into the second cavity 2 through a gap between the outer shoulder 3021 and the inner shoulder 102, in the embodiment, the outer shoulder 3021 is hermetically connected with the inner shoulder 102 to isolate a high-pressure area from a low-pressure area. For example, a silica gel ring or a rubber ring is employed between the outer shoulder 3021 and the inner shoulder 102.

The first cylinder 201 penetrates through the first baffle 302, an inner cavity of the first cylinder is in a cylindrical shape, and the cylindrical shape is coaxial with the first shaft hole 202. The first cylinder 301 includes a first portion 3041 and a second portion 3042. The first portion 3041 extends into the first cavity 1, and a side wall of the first portion is provided with a through first flow hole 305. The second portion 3042 extends into the second cavity 2, an opening of the second portion faces the first shaft hole 202, and a side wall of the second portion is provided with a through second flow hole 306.

The first flow hole 305 is an isosceles triangular hole. The isosceles triangle is gradually enlarged from a vertex angle to a bottom edge, which is beneficial for controlling a flow of the concentrated water. Certainly, those skilled in the art may also control the flow step by step through other triangles, which is not limited in the present application.

Preferably, the vertex angle of the isosceles triangle is an acute angle.

The transmission shaft 4 is a cylinder, which passes through the first shaft hole 202 and the first cylinder 301, and is hermetically and movably connected with the first shaft hole 202 and the first cylinder 301, one end of the transmission shaft entering the first cylinder 301 is provided with a diversion portion 401, and the other end of the transmission shaft extending from the first shaft hole 202 outside the valve cavity 14 is matched with the control unit 16 to control a motion of the transmission shaft 4, so that the diversion portion 401 is matched with the first flow hole 305 and the second flow hole 306 to control a liquid flow, so as to divert the liquid from the first cavity 1 to the second cavity 2.

The transmission shaft 4 is hermetically and movably connected with the first shaft hole 202 to avoid leakage of the concentrated water and damage to an external device. For example, the transmission shaft 4 and the first shaft hole 202 are sealed by oil seal.

Due to an excessively large distance between an inlet and an outlet of the diversion portion 401, a sufficient fitting area exists between the diversion portion 401 and the flowmeter 3, so that leakage caused by insufficient fitting and sealing due to an increased pressure will not occur.

Preferably, the control unit 16 controls a circumferential motion of the transmission shaft 4, and a bottom face of the isosceles triangular hole of the first flow hole 305 is parallel to an axis of the inner cavity of the first cylinder 301.

Preferably, the control unit 16 controls an axial motion of the transmission shaft 4, and a bottom face of the isosceles triangular hole of the first flow hole 305 is perpendicular to an axis of the inner cavity of the first cylinder 301.

A traditional faucet valve core adjusts the flow by adjusting openings of two fitted ceramic discs. For a pressurized reverse osmosis membrane water purification system, a fitting pressure and a contact area of the two fitted discs must be increased to ensure adaptation to different pressure environments, which will inevitably lead to a huge volume of a valve core and an increased friction resistance. The drainage device in the embodiment adapts to different pressure environments, and achieves the purposes of small volume, controllable fitting area, and small friction force.

A part of the transmission shaft 4 entering the valve cavity 14 and the flowmeter 3 may be made of corrosion-resistant and wear-resistant ceramic materials.

The diversion portion 401 is a flow through hole 4011 passing through the transmission shaft 4. The flow through hole 4011 includes a first diversion port 4012 and a second diversion port 4013 which are arranged in an outer wall of the transmission shaft 4. The first diversion port 4012 is matched with the first flow hole 305, and a liquid flow flowing from the flowmeter 3 into the flow through hole 4011 is controlled by the motion of the transmission shaft 4. The second diversion port 4013 is matched with the second flow hole 306 to divert the liquid from the flow through hole 4011 to the second cavity 2.

The motion of the transmission shaft 4 includes an axial motion or a circumferential motion.

Figure 6:
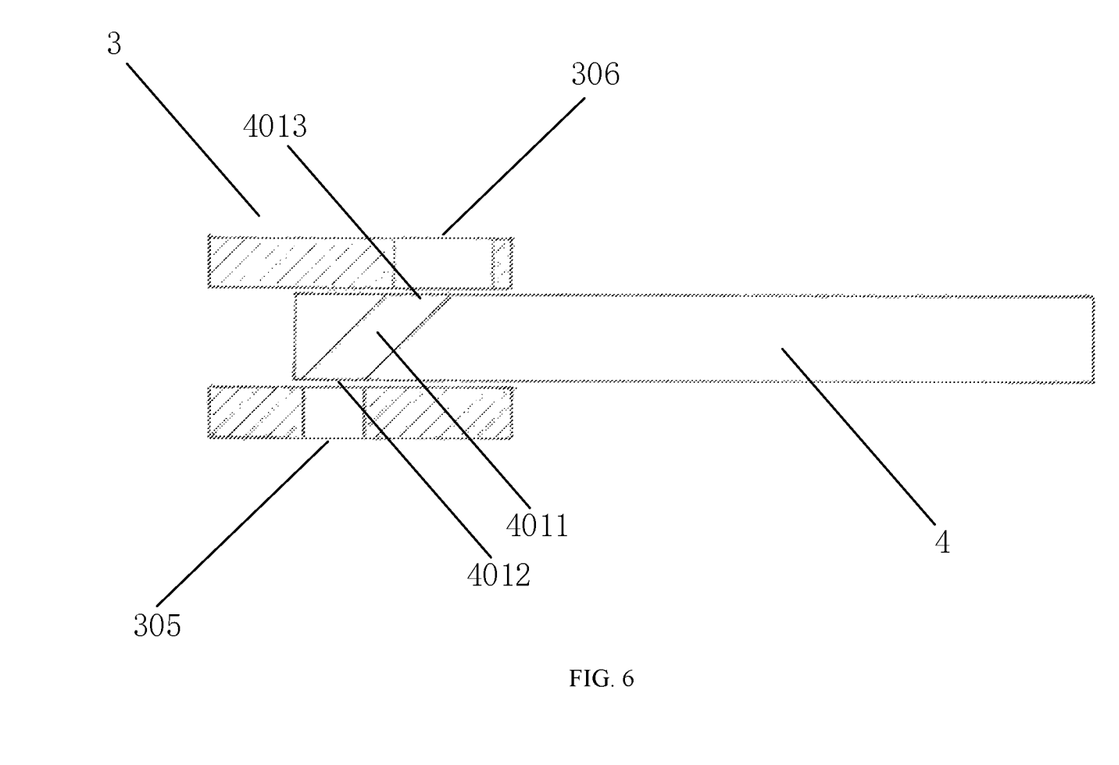
FIG. 6 is a structural diagram of a straight hole, a first flow hole and a second flow hole of the drainage device according to the embodiment of the present application.

With reference to FIG. 6, preferably, the flow through hole 4011 is a straight hole.

Figure 7:
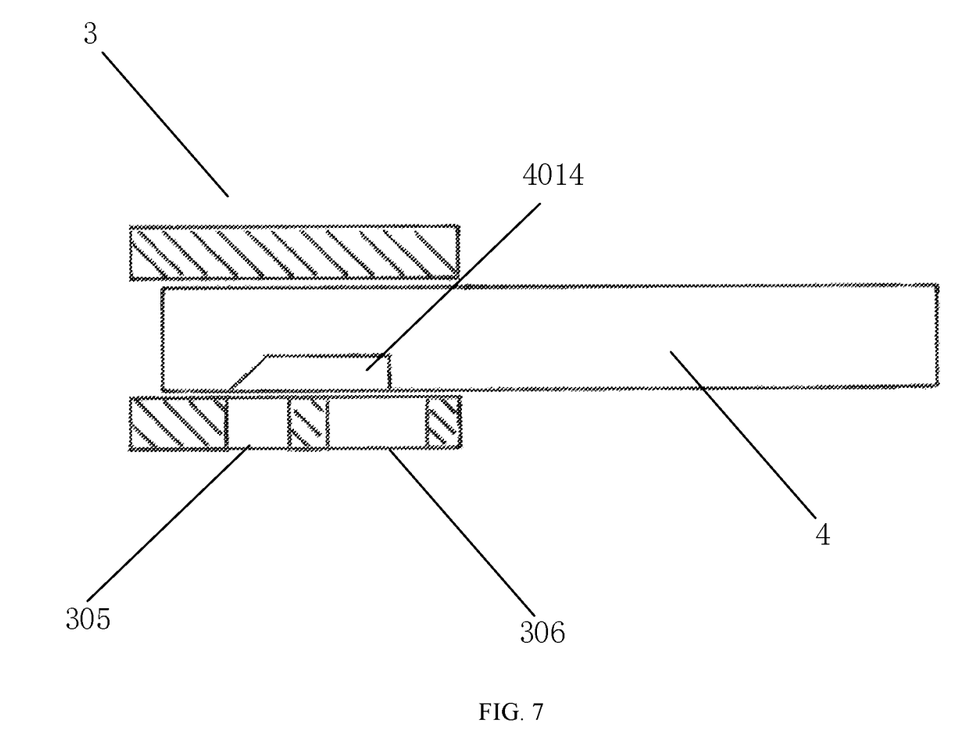
FIG. 7 is a structural diagram of a flow channel, the first flow hole and the second flow hole of the drainage device according to the embodiment of the present application.

With reference to FIG. 7, preferably, the diversion portion 401 is a flow channel 4014. The flow channel 4014 is matched with the first flow hole 305 and the second flow hole 306 through the motion of the transmission shaft 4 to control a liquid flow entering the flow channel 4014 from the first flow hole 305, and divert the liquid from the flow channel 4014 to the second cavity 2 through the second flow hole 306.

Preferably, a notch of the flow channel 4014 is gradually widened from the first flow hole 305 to the second flow hole 306, so that a flow of the concentrated water entering the flow channel 4014 is conveniently controlled.

Figure 4:
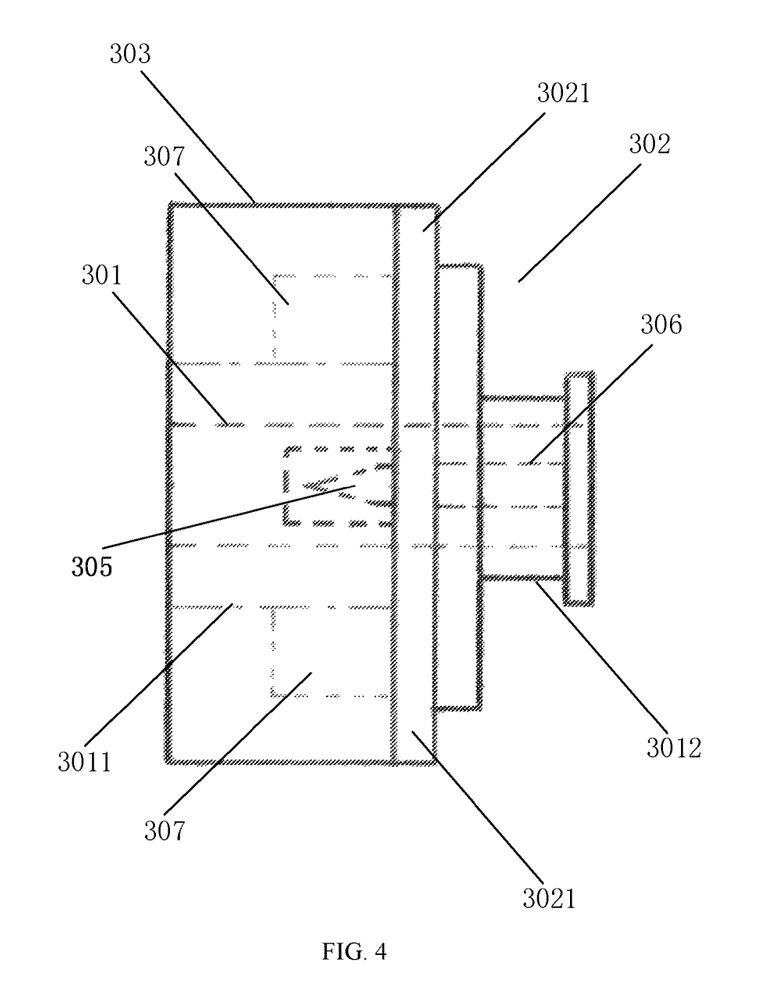
FIG. 4 is a side view of another flowmeter of the drainage device according to the embodiment of the present application.

With reference to FIG. 4, the flowmeter 3 further includes a second cylinder 303, which is sleeved outside the first cylinder 301, one end of the second cylinder is hermetically and fixedly connected with the first baffle 302, and the other end of the second cylinder is opened and faces the inner wall of the first cavity 1, and is provided with a first water inlet hole 304 penetrating through a side wall of the second cylinder.

Preferably, a cavity wall of the first cavity 1 opposite to an opening end of the second cylinder 303 is a second baffle 103; and the second baffle plate 103 is hermetically, movably and fixedly connected with the first cavity 1.

The first cavity 1 is a first device into which the concentrated water flows. Compared with raw water, highly concentrated water is more destructive to mechanical parts, especially has a corrosion effect on metal parts. In addition, the highly concentrated water is easy to form sediment and scale, especially has wearing damage to transmission parts, such as a confidential transmission thread, and bearings 15. Design of the second baffle 103 aims to facilitate cleaning and maintenance of parts in the first cavity 1.

Preferably, the first water inlet hole 304 is arranged in a cylinder wall of the second cylinder 303 far away from the first flow hole 305.

An outer side wall of the second cylinder 303 is movably connected with the inner wall of the first cavity 1, so that the parts in the first cavity 1 are cleaned and maintained conveniently, and the flowmeter 3 is also replaced conveniently.

The opening of the second cylinder 303 extends to a vicinity of the inner wall of the first cavity 1.

Most of persistent gas or bubbles in a water purification process may generally enter the first cavity 1. Due to an internal structure of the cavity, a mutually repulsive force with a pressure of the liquid in the cavity may be formed, and at the moment when the gas is discharged, the liquid may knock, causing liquid hammer on the parts in the valve cavity 14. Especially when the drainage device 7 is dynamically adjusted, this phenomenon is more obvious.

Figure 5:
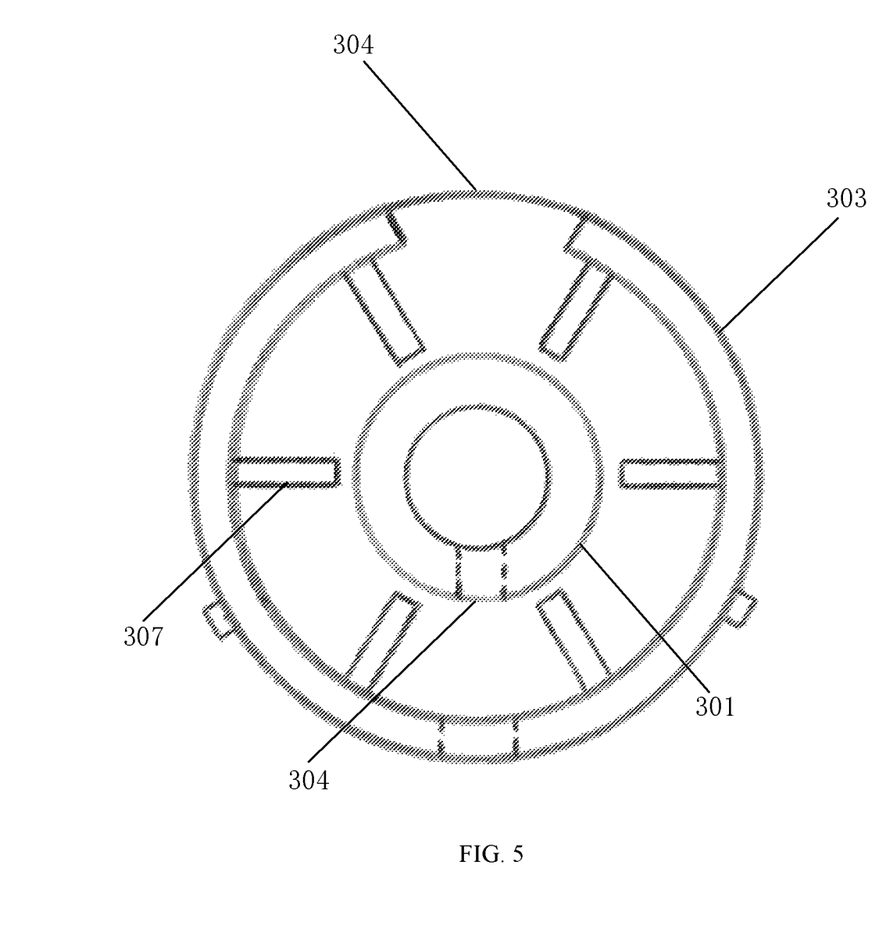
FIG. 5 is a front view of the flowmeter of the drainage device according to the embodiment of the present application.

With reference to FIG. 5, preferably, the second cylinder 303 further includes a plurality of splitter plates 307.

The splitter plates 307 are fixedly connected with the inner wall of the second cylinder 303 and used for slowing down a flow rate of the liquid flowing into the flowmeter 3.

The splitter plates 307 are used for dividing a liquid-gas mixture into several parts to slow down a flow rate into the diversion portion 401, so that the liquid-gas mixture may not interfere normal flow adjustment after being isolated, thus inhibiting an instantaneous impact of the liquid on the valve cavity 14, and slowing down vibration caused by the liquid.

Preferably, an inner cavity of the second cylinder 303 is in a cylindrical shape; and the splitter plates 307 are evenly distributed along an axis of the cylindrical shape and are perpendicular to the inner wall of the second cylinder 303.

Preferably, the first flow hole 305 is arranged between extended planes formed by two splitter plates 307; and the first water inlet hole 304 is arranged between two splitter plates 307.

Corresponding to the first embodiment of the present application, the present application further provides the second embodiment, which is namely a system for controlling discharging of concentrated water in a water purification process. Since the second embodiment is basically similar to the first embodiment, the description is relatively simple. The relevant parts refer to the corresponding description of the first embodiment. The device embodiment described below is only exemplary. The embodiment is described in detail hereinafter with reference to FIG. 1, FIG. 2, and FIG. 8.

Figure 8:
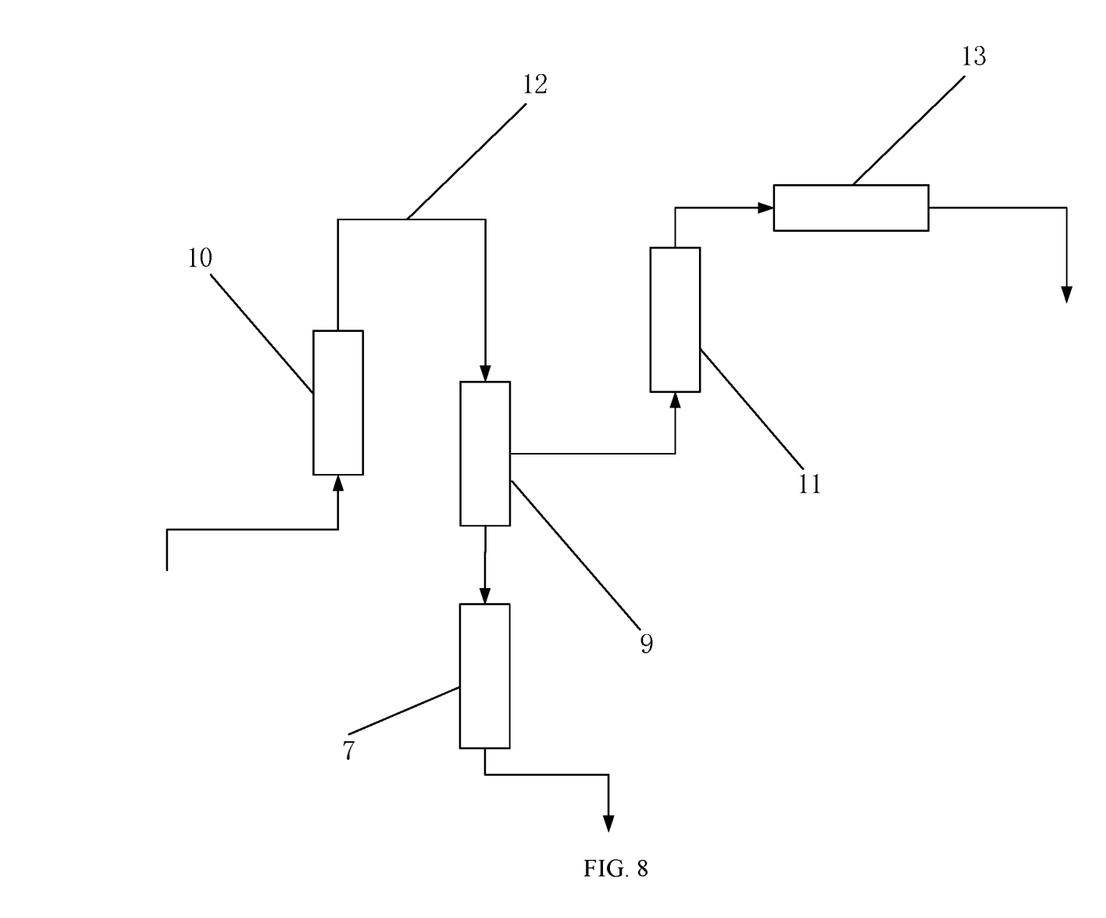
FIG. 8 is a structural diagram of a system for controlling discharging of concentrated water in a water purification process according to an embodiment of the present application.

With reference to FIG. 8, the embodiment provides the system for controlling discharging of concentrated water in the water purification process. The system at least includes the drainage device 7 according to the first embodiment, and a processor, a pressure gauge 8, a water purifier 9, a first switch 13, and a water delivery pipeline 12.

With reference to FIG. 1 and FIG. 2, in the first embodiment, the control unit 16 at least includes a transmission gear 5 and a first motor 6.

The transmission gear 5 is provided with a coaxial transmission through hole 501, the transmission through hole 501 is movably connected with the transmission shaft 4, and an outer edge of the transmission gear 5 is provided with first gear teeth 502.

The transmission gear 5 may be made of metal or ceramic.

The transmission shaft 4 may be displaced in a small range by displacing the transmission gear 5 in a large range, thus implementing precise control.

The first motor 6 is in signal connection with the processor, a driving rod of the first motor is provided with a driving gear 601, gear teeth of the driving gear 601 are connected with the first gear teeth 502, and the first motor 6 drives the driving gear 601 to drive the transmission gear 5 to rotate, so that the transmission shaft 4 moves.

A gap exists between the transmission shaft 4 and the transmission gear 5, especially when the first motor 6 drives the transmission gear 5 to rotate forward and backward, it is easy to cause moving, wearing, and noise among the parts.

Preferably, two sides of the transmission gear 5 are provided with bearings 15.

A shaking problem caused by a mutual motion among the first motor 6, the transmission gear 5, and the transmission shaft 4 is solved through the bearings 15, thus reducing a working resistance of the first motor 6 and prolonging a service life of the first motor.

In the case of insufficient circumferential operation and repeated operation within a certain angle range, neither the bearings 15 nor the first motor 6 is inevitable from local wearing, resulting in transmission irregularity or eccentricity.

Preferably, a radius of the transmission gear 5 is much greater than that of the transmission shaft 4, so that the first motor 6 may drive the transmission gear 5 to work with a very small force, and the first motor 6 has a wider application range and a smaller working torque, thus having a longer service life.

Meanwhile, since the radius of the transmission gear 5 is much greater than that of the transmission shaft 4, a circumferential displacement of the transmission gear 5 in each cycle of rotation is greater than that of the transmission shaft 4 or the bearings 15, so that the first motor 6, the transmission gear 5, and the bearings 15 may be fully operated during working, thus ensuring that the first motor 6, the transmission gear 5, and the bearings 15 are evenly stressed, and avoiding eccentricity. A service life of the bearings 15 may also be prolonged.

Arrangement of the transmission shaft 4 in the embodiment avoids axial deviation and shaking of the transmission shaft 4 caused by working of the first motor 6.

The embodiment avoids direct contact between the transmission system and the concentrated water.

The embodiment solves impact jamming of the drainage device 7 caused by resistance or vibration in different pressure and water flow environments, so that the drainage device 7 is operated smoothly.

The water purifier 9 at least includes a reverse osmosis membrane or an ultra-low pressure reverse osmosis membrane, a water inlet of the water purifier is used for inputting raw water, a first water outlet of the water purifier is used for outputting purified water, and a second water outlet of the water purifier is connected with the first water inlet hole of the drainage device for outputting the concentrated water.

The pressure gauge 8 is in signal connection with the processor, arranged in the first cavity 1, and used for collecting pressure information in the first cavity 1 and transmitting the pressure information to the processor;

Since impurities in the concentrated water are generally heavier than those in water, the impurities are easy to accumulate on a bottom of the first cavity 1. In order to prevent the impurities from affecting a pressure measurement accuracy, preferably, the pressure gauge 8 is arranged on a top of the first cavity 1.

Preferably, the pressure gauge 8 includes a pressure switch device.

The pressure switch device is in signal connection with the processor and used for transmitting pressure information to the processor when a collected pressure signal is within a preset pressure range.

Preferably, three pressure gauges 8 are arranged in the first cavity 1, and the pressure gauges 8 are distributed in a triangular shape.

The processor drives the drainage device 7 to work in a corresponding working mode according to the pressure information.

The first switch 13 is in signal connection with the processor, arranged in the water delivery pipeline 12, and used for controlling the water purifier 9 to produce water. When the first switch 13 is turned on, the system starts to produce purified water, and when the first switch 13 is turned off, the system stops producing the purified water.

The processor is used for acquiring a water production signal; acquiring first information according to the water production signal and transmitting opening information to the first switch 13, wherein the first information includes pressure information; and according to the first information and a preset control rule, driving the first motor 6 to control the transmission shaft 4 to move, so as to achieve a preset purified water discharge ratio of the concentrated water.

The system further includes a first TDS measuring device 10, wherein the first TDS measuring device is in signal connection with the processor, arranged in the water delivery pipeline 12 in front of the water purifier 9, and used for collecting first TDS information and transmitting the first TDS information to the processor. The first information further includes the first TDS information.

The first TDS information is often used as a basis for the processor to control the discharging of the concentrated water.

The system further includes a second TDS measuring device 11, wherein the first information further includes second TDS information.

The second TDS measuring device 11 is in signal connection with the processor, arranged in the water delivery pipeline 12 behind the water purifier 9, and used for collecting the second TDS information and transmitting the second TDS information to the processor.

As a discharging effect of the concentrated water, the second TDS information is used as a basis for the processor to control the discharging of the concentrated water.

One end of the transmission shaft 4 extending out of the valve cavity 14 from the first shaft hole 202 is provided with an external thread. The transmission through hole 501 is provided with an internal thread in threaded connection with the external thread of the transmission shaft. The first motor 6 drives the driving gear 601 to drive the transmission gear 5 to rotate, so that the transmission shaft 4 moves axially.

One end of the transmission shaft 4 extending out of the valve cavity 14 from the first shaft hole 202 is provided with an external gear. The transmission through hole 501 is provided with an internal gear in threaded connection with the external gear of the transmission shaft 4. The first motor 6 drives the driving gear 601 to drive the transmission gear 5 to rotate, so that the transmission shaft 4 moves circumferentially.

The external thread or the external gear may be processed by a metal pipe sleeved on a ceramic rod.

The above embodiments are only exemplary embodiments of the present application, and are not used to limit the present application. The scope of protection of the present application is defined by the claims. Those skilled in the art may make various modifications or equivalent substitutions within the essence and protection scope of the present application, and such modifications or equivalent substitutions should also be regarded as falling within the scope of protection of the present application.

What is claimed is:

1. A drainage device, comprising: a valve cavity, a flowmeter, a transmission shaft, and a control unit, wherein:
   an inner cavity wall of the valve cavity is provided with an inner shoulder, and the inner shoulder divides an inner cavity of the valve cavity into a first cavity and a second cavity which are communicated;
   the first cavity is provided with a first water inlet hole penetrating through the cavity wall;
   the second cavity is provided with a first water outlet hole penetrating through the cavity wall and a first shaft hole, and the first shaft hole is a cylindrical hole, and arranged on an opposite face of a communication port between the first cavity and the second cavity;

the flowmeter is arranged in a space formed by the first cavity and the second cavity, and comprises a first cylinder, a first baffle, a first flow hole, and a second flow hole;

the first baffle forms an outer shoulder of the flowmeter; and the outer shoulder is matched, and hermetically, movably and fixedly connected with the inner shoulder of the first cavity;

the first cylinder penetrates through the first baffle, an inner cavity of the first cylinder is in a cylindrical shape, and the cylindrical shape is coaxial with the first shaft hole; the first cylinder comprises a first portion and a second portion; the first portion extends into the first cavity, and a side wall of the first portion is provided with a through first flow hole; and the second portion extends into the second cavity, an opening of the second portion faces the first shaft hole, and a side wall of the second portion is provided with a through second flow hole; and the transmission shaft is a cylinder, which passes through the first shaft hole and the first cylinder, and is hermetically and movably connected with the first shaft hole and the first cylinder, one end of the transmission shaft entering the first cylinder is provided with a diversion portion, and the other end of the transmission shaft extending from the first shaft hole outside the valve cavity is matched with the control unit to control a motion of the transmission shaft, so that the diversion portion is matched with the first flow hole and the second flow hole to control a liquid flow, so as to divert a liquid from the first cavity to the second cavity.

2. The drainage device according to claim 1, wherein the diversion portion is a flow through hole passing through the transmission shaft; the flow through hole comprises a first diversion port and a second diversion port which are arranged in an outer wall of the transmission shaft; the first diversion port is matched with the first flow hole, and a liquid flow flowing from the flowmeter into the flow through hole is controlled by the motion of the transmission shaft; and the second diversion port is matched with the second flow hole to divert the liquid from the flow through hole to the second cavity.

3. The drainage device according to claim 1, wherein the diversion portion is a flow channel; and the flow channel is matched with the first flow hole and the second flow hole through the motion of the transmission shaft to control a liquid flow entering the flow channel from the first flow hole, and divert the liquid from the flow channel to the second cavity through the second flow hole.

4. The drainage device according to claim 3, wherein a notch of the flow channel is gradually widened from the first flow hole to the second flow hole.

5. The drainage device according to claim 1, wherein the control unit controls an axial motion of the transmission shaft, and a bottom face of the first flow hole is perpendicular to an axis of the inner cavity of the first cylinder.

6. The drainage device according to claim 1, wherein the control unit controls a circumferential motion of the transmission shaft, and a bottom face of the first flow hole is parallel to an axis of the inner cavity of the first cylinder.

7. The drainage device according to claim 1, wherein the flowmeter further comprises a second cylinder which is sleeved outside the first cylinder, one end of the second cylinder is hermetically and fixedly connected with the first baffle, and the other end of the second cylinder is opened and faces an inner wall of the first cavity, and is provided with a first water inlet hole penetrating through a side wall of the second cylinder.

8. The drainage device according to claim 7, wherein the first water inlet hole is arranged in a cylinder wall of the second cylinder far away from the first flow hole.

9. The drainage device according to claim 7, wherein an outer side wall of the second cylinder is movably connected with the inner wall of the first cavity.

10. The drainage device according to claim 7, wherein the opening of the second cylinder extends to a vicinity of the inner wall of the first cavity.

11. The drainage device according to claim 7, wherein the second cylinder further comprises a plurality of splitter plates; and the splitter plates are fixedly connected with the inner wall of the second cylinder and used for slowing down a flow rate of the liquid flowing into the flowmeter.

12. The drainage device according to claim 7, wherein the first water inlet hole is arranged between two splitter plates; and the first flow hole is arranged between extended planes formed by two splitter plates.

13. The drainage device according to claim 7, wherein a cavity wall of the first cavity opposite to an opening end of the second cylinder is a second baffle; and the second baffle is hermetically, movably and fixedly connected with the first cavity.

14. The drainage device according to claim 1, wherein the second cavity further comprises a gas accommodation portion for collecting gas in the second cavity and discharging the gas from the first water outlet hole.

15. A system for controlling discharging of concentrated water in a water purification process, wherein the system at least comprises the drainage device according to claim 1, and a processor, a pressure gauge, a water purifier, a first switch, and a water delivery pipeline;

the control unit at least comprises a transmission gear and a first motor;

the transmission gear is provided with a transmission through hole coaxial with the transmission gear, the transmission through hole is movably connected with the transmission shaft, and an outer edge of the transmission gear is provided with first gear teeth;

the first motor is in signal connection with the processor, a driving rod of the first motor is provided with a driving gear, gear teeth of the driving gear are connected with the first gear teeth, and the first motor drives the driving gear to drive the transmission gear to rotate, so that the transmission shaft moves;

the water purifier at least comprises a reverse osmosis membrane or an ultra-low pressure reverse osmosis membrane, a water inlet of the water purifier is used for inputting raw water, a first water outlet of the water purifier is used for outputting purified water, and a second water outlet of the water purifier is connected with the first water inlet hole of the drainage device for outputting concentrated water;

the pressure gauge is in signal connection with the processor, arranged in the first cavity, and used for collecting pressure information in the first cavity and transmitting the pressure information to the processor;

the first switch is in signal connection with the processor, arranged in the water delivery pipeline, and used for controlling the water purifier to produce water; and the processor is used for acquiring a water production signal; acquiring first information according to the water production signal and transmitting opening information to the first switch, wherein the first information comprises pressure information; and according to the first information and a preset control rule, driving the first motor to control the transmission shaft to move, so as to achieve a preset purified water discharge ratio of the concentrated water.

16. The system according to claim 15, further comprising a first TDS measuring device, wherein the first TDS measuring device is in signal connection with the processor, arranged in the water delivery pipeline in front of the water purifier, and used for collecting first TDS information and transmitting the first TDS information to the processor; and the first information further comprises the first TDS information.

17. The system according to claim 15, further comprising a second TDS measuring device, wherein the first information further comprises second TDS information; and the second TDS measuring device is in signal connection with the processor, arranged in the water delivery pipeline behind the water purifier, and used for collecting the second TDS information and transmitting the second TDS information to the processor.

18. The system according to claim 15, wherein one end of the transmission shaft extending out of the valve cavity from the first shaft hole is provided with an external thread; the transmission through hole is provided with an internal thread in threaded connection with the external thread of the transmission shaft; and the first motor drives the driving gear to drive the transmission gear to rotate, so that the transmission shaft moves axially.

19. The system according to claim 15, wherein one end of the transmission shaft extending out of the valve cavity from the first shaft hole is provided with an external gear; the transmission through hole is provided with an internal gear in threaded connection with the external gear of the transmission shaft; and the first motor drives the driving gear to drive the transmission gear to rotate, so that the transmission shaft moves circumferentially.

20. The system according to claim 15, wherein two sides of the transmission gear are provided with bearings.

\* \* \* \* \*